(12) United States Patent
Iwase

(10) Patent No.: US 6,656,618 B2
(45) Date of Patent: Dec. 2, 2003

(54) FUEL CELLS SYSTEM AND METHOD OF CONTROLLING CELLS

(75) Inventor: Masayoshi Iwase, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 216 days.

(21) Appl. No.: 09/741,069

(22) Filed: Dec. 21, 2000

(65) Prior Publication Data

US 2001/0018138 A1 Aug. 30, 2001

Related U.S. Application Data

(63) Continuation of application No. PCT/JP99/02909, filed on May 31, 1999.

(30) Foreign Application Priority Data

Jun. 25, 1998 (JP) .............................. 10-196763

(51) Int. Cl.[7] .............................. H01M 8/04
(52) U.S. Cl. .............................. 429/23; 429/22; 429/13; 429/12
(58) Field of Search .............................. 429/23, 22, 13, 429/12

(56) References Cited

U.S. PATENT DOCUMENTS

| 5,631,532 | A | | 5/1997 | Azuma et al. |
| 5,646,852 | A | * | 7/1997 | Lorenz et al. ......... 364/431.051 |
| 5,714,874 | A | * | 2/1998 | Bonnefoy ................... 323/299 |
| 6,306,532 | B1 | * | 10/2001 | Kurita et al. ................. 429/20 |

FOREIGN PATENT DOCUMENTS

| JP | 60-216467 | 10/1985 |
| JP | 62-119869 | 6/1987 |
| JP | 63-236269 | 10/1988 |
| JP | 4-58463 | 2/1992 |
| JP | 4-82169 | 3/1992 |
| JP | 7-75214 | 3/1995 |
| JP | 7-105964 | 4/1995 |
| JP | 7-240212 | 9/1995 |

* cited by examiner

*Primary Examiner*—Patrick Ryan
*Assistant Examiner*—Angela J Martin
(74) *Attorney, Agent, or Firm*—Oblon, Spivak, McClelland, Maier & Neustadt, P.C.

(57) ABSTRACT

A system which enables fuel cells to be activated at a working point of high energy conversion efficiency. A control unit calculates a required output of an inverter from an input accelerator travel. The control unit specifies an output electric current-output voltage characteristic corresponding to a gas flow rate, obtains a point of highest energy conversion efficiency on the specified characteristic to specify the point as a working point of fuel cells, and computes an output electric power of the fuel cells at the specified working point. The control unit determines an output voltage required to a battery, based on a difference between the calculated required output of the inverter and the computed output electric power of the fuel cells and a state of charge of the battery. The control unit controls a DC—DC converter and regulates the output voltage of the DC—DC converter, so as to cause the battery to generate the output voltage thus determined. The control unit subsequently controls the inverter, so as to cause a motor to consume electric power corresponding to the required output.

2 Claims, 6 Drawing Sheets

FUEL CELLS SYSTEM AND METHOD OF CONTROLLING CELLS

CROSS-REFERENCE TO RELATED DOCUMENTS

The present document is a continuation of PCT/JP99/02909, filed on May 31, 1999, and JP 10-196763, filed on Jun. 25, 1998, the entire contents of both of which are hereby incorporated herein by reference.

FIELD OF THE INVENTION

The present invention relates to a fuel cells system that enables fuel cells to be activated with a high efficiency of energy conversion, as well as to a method of controlling such fuel cells.

DISCUSSION OF THE BACKGROUND

As shown in an example of FIG. 5, in a background art fuel cells system mounted on an electric vehicle, a reformer unit 128 receives supplies of fuel 124, for example methanol and water, fed via a pump 126 and produces a hydrogen-containing gaseous fuel from the fuel 124 through a steam reforming reaction of methanol. Fuel cells 136 receive a flow of the produced gaseous fuel and the air 130 and generate an electromotive force through electrochemical reactions of the gaseous fuel and the air 130. The electric power generated by the fuel cells 136 and the electric power output from a battery 140, which is connected in parallel with the fuel cells 136, are supplied to an inverter 144 to drive a motor 146 and obtain a driving force of the electric vehicle.

A control unit 120 calculates a required output (required electric power) of the inverter 144 from an accelerator travel of the electric vehicle measured by an accelerator pedal position sensor 122, and regulates the inverter 144 based on the calculated required output. Such regulation causes electric power corresponding to the required output to be supplied to the motor 146 via the inverter 144.

The fuel cells 136 output the electric power to cover the required output of the inverter 144. When the electric power output from the fuel cells 136 is insufficient for the required output, the battery 140 outputs the electric power to the inverter 144 to compensate for the insufficiency. The output electric power of the fuel cells 136 accordingly depends upon the required output of the inverter 144.

In response to a requirement of the output of electric power from the inverter 144, the fuel cells 136 can not output the required electric power in the case in which the gaseous fuel supplied from the reformer unit 128 to the fuel cells 136 is not sufficient for the output of the required electric power. That is, the output electric power of the fuel cells 136 also depends upon the quantity of the gaseous fuel (that is, the gas flow rate) fed to the fuel cells 136.

The control unit 120 drives the pump 126 based on the required output of the inverter 144, and regulates the quantities of the fuel 124 fed to the reformer unit 128, in order to regulate the quantity of the gaseous fuel supplied to the fuel cells 136 according to the required output of the inverter 144.

The quantity of the gaseous fuel produced by the reformer unit 128 does not immediately increase (or decrease) with an increase (or a decrease) in supplied quantities of the fuel 124, but increases or decreases after a time lag of 2 to 20 seconds. The quantity of the gaseous fuel required for the fuel cells 136 is thus not always identical with the actual supply of the gaseous fuel (the gas flow rate) to the fuel cells 136.

As described above, in the background art fuel cells system, the output electric power of the fuel cells 136 depends upon the required output of the inverter 144 and upon the quantity of the gaseous fuel (the gas flow rate) supplied to the fuel cells 136. The working point of the fuel cells 136 is thus varied with variations in required output of the inverter 144 and in gas flow rate.

FIG. 6 is a characteristic chart showing variations in power generation efficiency versus the output electric power in general fuel cells with a variation in quantity of the gaseous fuel (the gas flow rate) supplied to the fuel cells as a parameter. FIG. 7 is a characteristic chart showing a variation in output electric power versus the required quantity of the gaseous fuel in general fuel cells.

In the background art fuel cells system described above, as shown in FIG. 6, although the fuel cells are capable of being activated at a working point "a" of high power generation efficiency, the fuel cells may be activated, for example, at a working point "b" of low power generation efficiency since the actual working point is varied with a variation in gas flow rate.

In the background art fuel cells system described above, as shown in FIG. 7, even when a sufficient quantity Qc of the gaseous fuel is supplied from the reformer unit to the fuel cells to generate an output electric power Wc, the fuel cells may be activated, for example, at a working point "d" to generate only an output electric power Wd since the actual working point is varied with a variation in required output of the inverter. In this case, the quantity of the gaseous fuel required to generate the output electric power Wd is equal to only Qd, and the wasteful quantity of the gaseous fuel is (Qc−Qd). This lowers the utilization factor of the gaseous fuel.

As described above, in the background art fuel cells system, the working point of the fuel cells is varied with variations in required output of the inverter and in gas flow rate. The fuel cells are thus not always activated at the working point of high power generation efficiency or at the working point of high gas utilization factor.

The power generation efficiency and the gas utilization factor have a tradeoff relationship, so that it is difficult to enhance both the power generation efficiency and the gas utilization factor. Maximizing the product of the power generation efficiency and the gas utilization factor enhances both the power generation efficiency and the gas utilization factor as much as possible. The product of the power generation efficiency and the gas utilization factor is expressed as an energy conversion efficiency of the fuel cells.

SUMMARY OF THE INVENTION

An object of the present invention is thus to solve the problems of the background art and to provide a fuel cells system that enables fuel cells to have an enhanced energy conversion efficiency.

At least part of the above and the other related objects is attained by a first fuel cells system that has fuel cells, which receive a supply of a gas and generate electric power, and which supply the generated electric power to a load. The first fuel cells system includes: a gas flow rate-relating quantity measurement unit that measures a gas flow rate-relating quantity, which relates to a flow rate of the gas supplied to the fuel cells; and a control unit that specifies a working point associated with an output electric current-output voltage characteristic of the fuel cells corresponding to the observed gas flow rate-relating quantity, and regulates electric power to be taken out of the fuel cells, so as to cause the fuel cells to be activated at the specified working point.

The present invention is also directed to a first method of controlling fuel cells that receive a supply of a gas and generate electric power. The first method includes the steps of: (a) measuring a gas flow rate-relating quantity, which relates to a flow rate of the gas supplied to the fuel cells; (b) specifying a working point associated with an output electric current-output voltage characteristic of the fuel cells corresponding to the observed gas flow rate-relating quantity; and (c) regulating electric power to be taken out of the fuel cells, so as to cause the fuel cells to be activated at the specified working point.

The operation of the first fuel cells system and the corresponding first method of the present invention measures the gas flow rate-relating quantity, which relates to the flow rate of the gas supplied to the fuel cells, and specifies a working point associated with the output electric current-output voltage characteristic of the fuel cells corresponding to the observed gas flow rate-relating quantity. The operation then regulates the electric power to be taken out of the fuel cells, so as to cause the fuel cells to be activated at the specified working point.

In the first fuel cells system and the corresponding first method of the present invention, the working point of the highest energy conversion efficiency on the output electric current-output voltage characteristic is specified as the working point associated with the output electric current-output voltage characteristic corresponding to the observed gas flow rate-relating quantity. This arrangement enables the fuel cells to be activated at the working point of the highest energy conversion efficiency, thus enhancing both the power generation efficiency and the gas utilization factor of the fuel cells as much as possible.

The present invention is also directed to a second fuel cells system that has fuel cells, which receive a supply of a gas and generate electric power, and a secondary battery, which accumulates electric power therein and outputs the accumulated electric power. The second fuel cells system supplies at least one of the electric power generated by the fuel cells and the electric power output from the secondary battery to a load. The second fuel cells system includes: a gas flow rate-relating quantity measurement unit that measures a gas flow rate-relating quantity, which relates to a flow rate of the gas supplied to the fuel cells; and a control unit that specifies a working point associated with an output electric current-output voltage characteristic of the fuel cells corresponding to the observed gas flow rate-relating quantity, determines an amount of electric power to be taken out of the fuel cells, which is required to activate the fuel cells at the specified working point, as well as an amount of electric power to be supplied to the load, and regulates at least one of electric power to be output from the secondary battery and electric power to be accumulated in the secondary battery, based on the two amounts of electric power thus determined.

The present invention is also directed to a second method of controlling a secondary battery in a fuel cells system having fuel cells, which receive a supply of a gas and generate electric power, and the secondary battery, which accumulates electric power therein and outputs the accumulated electric power, and supplying at least one of the electric power generated by the fuel cells and the electric power output from the secondary battery to a load. The second method includes the steps of: (a) measuring a gas flow rate-relating quantity, which relates to a flow rate of the gas supplied to the fuel cells; (b) specifying a working point associated with an output electric current-output voltage characteristic of the fuel cells corresponding to the observed gas flow rate-relating quantity; (c) determining an amount of electric power to be taken out of the fuel cells, which is required to activate the fuel cells at the specified working point, as well as an amount of electric power to be supplied to the load; and (d) regulating at least one of electric power to be output from the secondary battery and electric power to be accumulated in the secondary battery, based on the two amounts of electric power thus determined.

The operation of the second fuel cells system and the corresponding second method of the present invention measures the gas flow rate-relating quantity, which relates to the flow rate of the gas supplied to the fuel cells, and specifies a working point associated with the output electric current-output voltage characteristic of the fuel cells corresponding to the observed gas flow rate-relating quantity. The operation subsequently determines the amount of electric power to be taken out of the fuel cells, which is required to activate the fuel cells at the specified working point, as well as the amount of electric power to be supplied to the load, and regulates the electric power to be output from the secondary battery or the electric power to be accumulated in the secondary battery, based on the two amounts of electric power thus determined. Regulating the electric power of the secondary battery in this manner causes the determined amount of electric power to be taken out of the fuel cells and enables the fuel cells to be activated at the specified working point.

In the second fuel cells system and the corresponding second method of the present invention, the working point of the highest energy conversion efficiency is specified as the working point associated with the output electric current-output voltage characteristic corresponding to the observed gas flow rate-relating quantity. This arrangement enables the fuel cells to be activated at the working point of the highest energy conversion efficiency through the regulation discussed above, thus enhancing both the power generation efficiency and the gas utilization factor of the fuel cells as much as possible.

In accordance with one preferable application of the present invention, the second fuel cells system further includes a state of charge sensor that measures a state of charge of the secondary battery. In this application, the control unit regulates at least one of the electric power to be output from the secondary battery and the electric power to be accumulated in the secondary battery, based on the observed state of charge in addition to the two amounts of electric power determined.

In a similar manner, it is preferable that the second method of the present invention further includes the step of (e) measuring a state of charge of the secondary battery. In this application, the step (d) includes the step of regulating at least one of the electric power to be output from the secondary battery and the electric power to be accumulated in the secondary battery, based on the observed state of charge in addition to the two amounts of electric power determined.

In general, the output electric power of the secondary battery depends upon the state of charge of the secondary battery. In the case in which the state of charge of the secondary battery is close to the full charge level, it is impossible to further accumulate the electric power in the secondary battery. The control is accordingly required to prevent the electric power from being further accumulated in such cases.

In either the first fuel cells system or the second fuel cells system of the present invention, it is preferable that the control unit specify a point of highest energy conversion efficiency on the output electric current-output voltage characteristic as the working point.

In a similar manner, in either the first method or the second method of the present invention, it is preferable that the step (b) includes the step of specifying a point of highest energy conversion efficiency on the output electric current-output voltage characteristic as the working point.

Specifying the working point in this manner enables the fuel cells to be activated at the working point of the highest energy conversion efficiency.

The present invention is also directed to a third fuel cells system, which includes: fuel cells that receive a supply of a gaseous fuel and an oxidizing gas and generate electric power through an electrochemical reaction of the gaseous fuel and the oxidizing gas; a flow sensor that measures a flow rate of at least one of the gaseous fuel and the oxidizing gas supplied to the fuel cells; a secondary battery that accumulates electric power therein and outputs the accumulated electric power; a state of charge sensor that measures a state of charge of the secondary battery; an inverter that receives a supply of electric power from at least one of the fuel cells and the secondary battery to drive a motor; a converter that varies a voltage output from the fuel cells and applies the varied voltage in parallel to the secondary battery and the inverter; and a control unit that specifies a working point associated with an output electric current-output voltage characteristic of the fuel cells corresponding to the observed flow rate, determines an amount of electric power to be taken out of the fuel cells, which is required to activate the fuel cells at the specified working point, determines an amount of electric power to be supplied to the inverter based on external information, and regulates the voltage output from the converter, based on the two amounts of electric power thus determined and the observed state of charge.

In the third fuel cells system of the present invention, the flow sensor measures the flow rate of at least the gaseous fuel or the oxidizing gas supplied to the fuel cells. The state of charge sensor measures the state of charge of the secondary battery. The inverter receives a supply of electric power from at least one of the fuel cells and the secondary battery to drive the motor. The converter increases or decreases the voltage output from the fuel cells and applies the varied voltage in parallel to the secondary battery and the inverter. The control unit specifies a working point associated with the output electric current-output voltage characteristic of the fuel cells corresponding to the flow rate observed by the flow sensor, and determines the amount of electric power to be taken out of the fuel cells, which is required to activate the fuel cells at the specified working point. The control unit also determines the amount of electric power to be supplied to the inverter based on external information. The control unit then regulates the voltage output from the converter, based on the two amounts of electric power thus determined and the state of charge observed by the state of charge sensor. This arrangement regulates the electric power of the secondary battery (either the output electric power or the accumulated electric power), to which the regulated voltage is applied, to a desired level. Such regulation causes the determined amount of electric power to be taken out of the fuel cells and enables the fuel cells to be activated at the specified working point.

In the third fuel cells system of the present invention, the working point of the highest energy conversion efficiency is specified as the working point associated with the output electric current-output voltage characteristic corresponding to the observed gas flow rate. This arrangement enables the fuel cells to be activated at the working point of the highest energy conversion efficiency through the regulation discussed above, thus enhancing both the power generation efficiency and the gas utilization factor of the fuel cells as much as possible.

The technique of the present invention may also be attained by an electric vehicle having any one of the first through the third fuel cells system mounted thereon. The electric vehicle has a motor as the load, which receives a supply of electric power from the fuel cells and is driven to give the driving force of the electric vehicle.

Mounting any of the first through the third fuel cells systems on the electric vehicle enhances the energy conversion efficiency of the electric vehicle.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
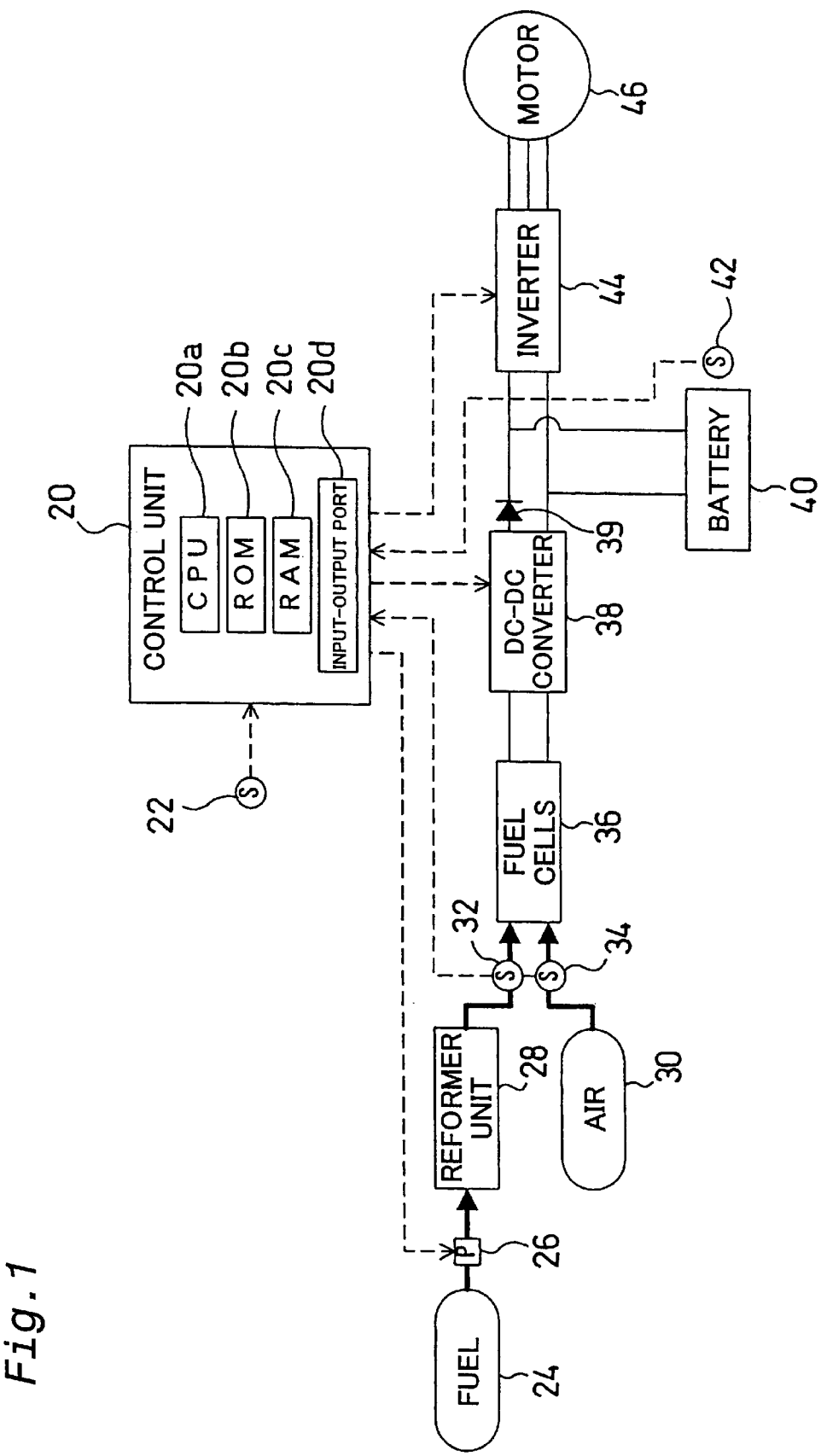
FIG. 1 illustrates the structure of a fuel cells system in one embodiment of the present invention.

One mode of carrying out the present invention is described below as an embodiment. FIG. 1 illustrates the structure of a fuel cells system in one embodiment of the present invention. The fuel cells system of the present invention can be mounted on an electric vehicle.

The following describes the structure of the fuel cells system shown in FIG. 1 and the general operations thereof. The fuel cells system shown in FIG. 1 includes a control unit 20, an accelerator pedal position sensor 22, a pump 26, a reformer unit 28, flow sensors 32 and 34, fuel cells 36, a DC—DC converter 38, a battery 40, a state of charge SOC sensor 42, an inverter 44, and a motor 46 as main constituents.

The pump 26 is controlled in response to a control signal output from the control unit 20 to feed supplies of fuel 24, for example methanol and water, to the reformer unit 28.

The reformer unit 28 produces a hydrogen rich gas (reformed gas) containing hydrogen from the supplies of water and methanol fed as the fuel 24 through a steam reforming reaction of methanol expressed by Equation (1):

$$CH_3OH + H_2O \rightarrow 3H_2 + CO_2 \quad (1)$$

The fuel cells 36 receive a supply of the hydrogen rich gas produced by the reformer unit 28 as a gaseous fuel and a supply of the air 30 as an oxygen-containing oxidizing gas and generate electric power through electrochemical reactions expressed by Equations (2) through (4):

$$H_2 \rightarrow 2H^+ + 2e^- \quad (2)$$

$$2H^+ + 2e^- + (\tfrac{1}{2})O_2 \rightarrow H_2O \quad (3)$$

$$H_2 + (\tfrac{1}{2})O_2 \rightarrow H_2O \quad (4)$$

In this embodiment, the fuel cells 36 are polymer electrolyte fuel cells and have a stack structure obtained by laying a plurality of unit cells (not shown) one upon another, in which each unit cell includes an electrolyte membrane, an anode, a cathode, and a pair of separators. The supply of the hydrogen rich gas is fed to the anode of each unit cell via a gaseous fuel flow path (not shown) to be subjected to the reaction expressed by Equation (2). The supply of the air is fed to the cathode of each unit cell via an oxidizing gas flow path (not shown) to be subjected to the reaction expressed by Equation (3). Equation (4) shows the total reaction occurring in the fuel cells.

The flow sensor 32 measures the flow rate of the hydrogen rich gas flowing through a hydrogen rich gas supply conduit to the fuel cells 36, whereas the flow sensor 34 measures the flow rate of the air flowing through an air supply conduit to the fuel cells 36. The results of the measurements are respectively sent to the control unit 20. The flow sensors 32 and 34 are not required to directly measure the flow rates of the hydrogen rich gas and the air but may measure any quantities relating to the flow rates of the hydrogen rich gas and the air.

The battery 40 and the inverter 44 are connected in parallel with the fuel cells 36 via the DC—DC converter 38. The electric power generated by the fuel cells 36 is supplied to the inverter 44 via the DC—DC converter 38 and also to the battery 40 according to the system requirements.

The DC—DC converter 38 increases or decreases the voltage output from the fuel cells 36 and applies the varied voltage in parallel to the inverter 44 and the battery 40 via a diode 39. The DC—DC converter 38 regulates the increased or decreased voltage in response to a control signal from the control unit 20.

The diode 39 causes the electric current to flow only in one direction from the DC—DC converter 38 to the inverter 44 or the battery 40.

The battery 40 accumulates therein the electric power supplied from the fuel cells 36 and the electric power regenerated by the motor 46 via the inverter 44 according to the system requirements, and supplies the accumulated electric power to the inverter 44. In this embodiment, a lead acid battery as a secondary battery is utilized as the battery 40. A variety of other batteries, such as nickel-cadmium batteries, nickel-hydrogen batteries, lithium batteries, etc. are also applicable for the battery 40. The battery 40 has a power source capacity, which depends upon an expected driving state of the electric vehicle, that is, an expected magnitude of loading, and a power source capacity of the fuel cells 36.

The SOC sensor 42 measures a state of charge (SOC) of the battery 40 and sends the results of the measurement to the control unit 20. In a concrete example, the SOC sensor 42 includes an SOC meter that sums the products of the electric current of charging or discharging and the time in the battery 40. The control unit 20 calculates the state of charge of the battery 40, based on the cumulative value. The SOC sensor 42 may, as examples, include a voltage sensor that measures the output voltage of the battery 40 or a specific gravity sensor that measures the specific gravity of an electrolytic solution in the battery 40, instead of the SOC meter. In such cases, the control unit 20 calculates the state of charge of the battery 40 from the corresponding observed values.

The inverter 44 drives the motor 46 with the electric power supplied from the fuel cells 36 and the battery 40. More concretely, the inverter 44 converts a d.c. voltage applied from the DC—DC converter 38 or the battery 40 into three-phase a.c. voltages and applies the converted three-phase a.c. voltages to the motor 46. The inverter 44 regulates the amplitude (more specifically, the pulse width) and the frequency of the three-phase a.c. voltages applied to the motor 46 in response to a control signal from the control unit 20, thus regulating the torque produced by the motor 46.

The inverter 44 actually includes six switching elements (for example, bipolar MOSFET (IGBT)) as main circuit elements. The switching operations of these switching elements are controlled in response to the control signal from the control unit 20, so as to convert the applied d.c. voltage into three-phase a.c. voltages of desired amplitude and frequency.

The motor 46 is constructed, for example, as a three-phase synchronous motor and is driven with the electric power supplied from the fuel cells 36 and the motor 46 via the inverter 44 to apply a torque to a drive shaft (not shown). The produced torque is transmitted to an axle (not shown) of the electric vehicle via a gear unit (not shown) to give a rotational driving force to wheels. The electric vehicle accordingly receives the driving force to run.

The accelerator pedal position sensor 22 measures the accelerator travel of the electric vehicle and sends the results of the measurement to the control unit 20.

The control unit 20 includes a CPU 20*a*, a ROM 20*b*, a RAM 20*c*, and an input-output port 20*d*. The CPU 20*a* carries out desired operations according to control programs to attain a series of processings and controls. The control programs, control data used in the course of the execution of the operations, data representing output electric current-output voltage characteristics at the respective gas flow rates supplied to the fuel cells 36 as a parameter, and data representing output electric current-output voltage characteristics at the respective states of charge (SOCs) of the battery 40 as a parameter, the last two of which will be discussed later, are all stored in advance in the ROM 20*b*. A diversity of data obtained in the course of the execution of the operations are temporarily stored in the RAM 20*c*. The input-output port 20*d* inputs the results of the measurements sent from the various sensors to give the inputs to the CPU 20*a*, and outputs control signals to the respective constituents in response to instructions from the CPU 20*a*.

Figure 2:
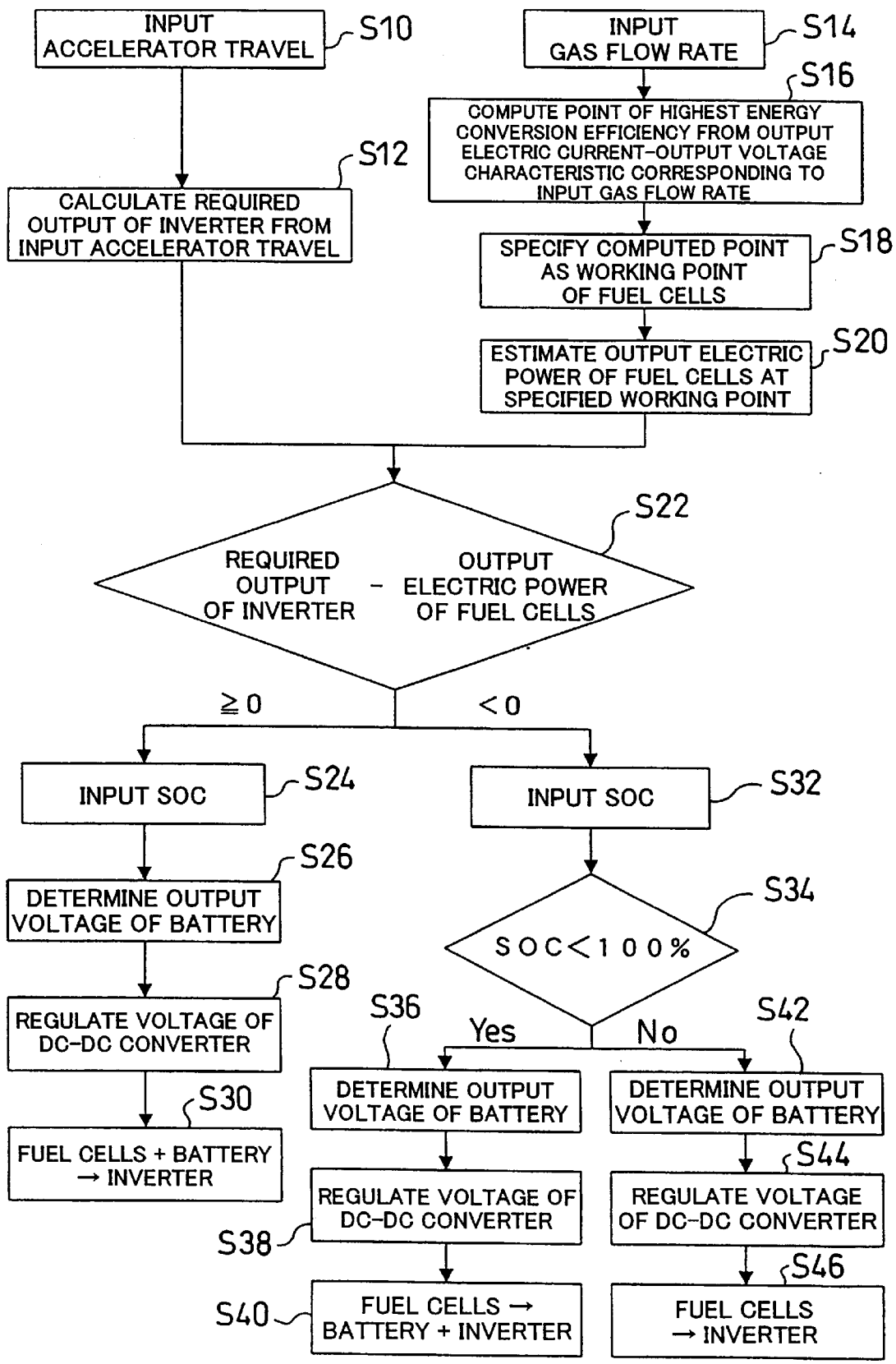
FIG. 2 is a flowchart showing a processing routine executed in the fuel cells system of FIG. 1.

The series of the processing executed in the fuel cells system of the embodiment is described in detail with the flowchart of FIG. 2.

FIG. 2 is a flowchart showing a processing routine executed in the fuel cells system of FIG. 1. When the program enters the routine of FIG. 2, the control unit 20 first receives the accelerator travel or position measured by the accelerator pedal position sensor 22 (step S10). This step causes the control unit 20 to detect a driver's requirement, that is, how much electric power is to be supplied to the motor 46 via the inverter 44 to drive the electric vehicle. The control unit 20 then calculates the electric power to be supplied to the inverter 44 (that is, the required output of the inverter 44) from the input accelerator travel (step S12).

The control unit 20 also inputs the flow rate of the hydrogen rich gas or the gaseous fuel measured by the flow sensor 32 as the gas flow rate (step S14). A fixed relationship is held between the quantities of hydrogen and oxygen that are subjected to the electrochemical reactions as shown by Equation (4). The control unit 20 may accordingly input the flow rate of the air or the oxidizing gas measured by the flow sensor 34 as the gas flow rate, in place of the flow rate of the hydrogen rich gas or the gaseous fuel. The control unit 20 may alternatively input both the flow rates of the hydrogen rich gas and the air.

As mentioned previously, the data representing the output electric current-output voltage characteristics at the respective gas flow rates as the parameter in the fuel cells 36 are stored in the ROM 20b included in the control unit 20.

Figure 3:
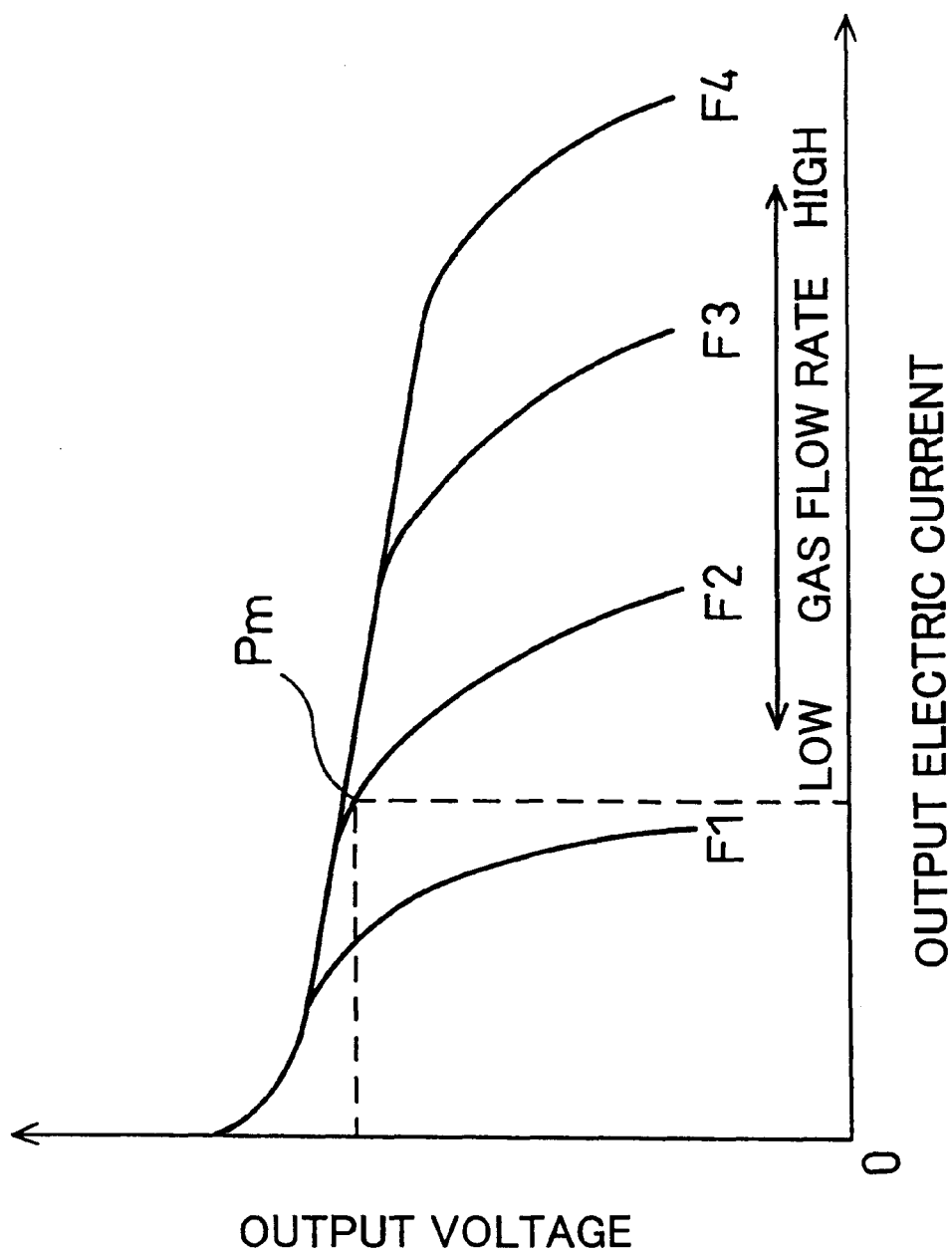
FIG. 3 is a characteristic chart showing variations in output electric current-output voltage characteristic with a variation in gas flow rate as a parameter in the fuel cells 36 shown in FIG. 1.

FIG. 3 is a characteristic chart showing variations in output electric current-output voltage characteristic with a variation in gas flow rate as the parameter in the fuel cells 36 shown in FIG. 1. In the graph of FIG. 3, the output voltage of the fuel cells 36 is plotted as the ordinate and the output electric current is plotted as the abscissa.

As shown in FIG. 3, the output electric current-output voltage characteristic of the fuel cells 36 is varied with a variation in flow rate of the gaseous fuel flowing into the fuel cells 36 (the gas flow rate). The process of specifying the gas flow rate unequivocally determines the output electric current-output voltage characteristic corresponding to the specified gas flow rate. In the graph of FIG. 3, the characteristic curve changes as F1, F2, F3, to F4 in a sequence of the gas flow rate.

The output electric current-output voltage characteristics at the respective gas flow rates are stored in the ROM 20b. The control unit 20 reads the output electric current-output voltage characteristic corresponding to the input gas flow rate from the ROM 20b in the control unit 20. The control unit 20 subsequently computes a point of the highest energy conversion efficiency of the fuel cells 36 from the read-out output electric current-output voltage characteristic (step S16).

The energy conversion efficiency of the fuel cells 36 is obtained as the product of the power generation efficiency and the gas utilization factor (power generation efficiency×gas utilization factor) of the fuel cells 36. As is known in general, in the fuel cells, the power generation efficiency is proportional to the output voltage, and the required quantity of the gaseous fuel is proportional to the output electric current. The product of the power generation efficiency and the gas utilization factor of the fuel cells is thus replaced by the product of the output voltage and the output electric current. In other words, the energy conversion efficiency of the fuel cells is expressed as the product of the output voltage and the output electric current (output voltage×output electric current) of the fuel cells.

When the characteristic curve F2 shown in FIG. 3 is read out as the output electric current-output voltage characteristic corresponding to the observed gas flow rate, as an example, the control unit 20 computes a point Pm having the maximum product of the output voltage and the output electric current on the read-out output electric current-output voltage characteristic curve F2, and specifies the point Pm as the point of the highest energy conversion efficiency.

The product of the output voltage and the output electric current of the fuel cells corresponds to the output electric power of the fuel cells. The point of the highest output electric power of the fuel cells is equivalent to the point of the highest energy conversion efficiency.

After computing the point of the highest energy conversion efficiency, the control unit 20 specifies the computed point as a working point of the fuel cells (step S18) and estimates the output electric power of the fuel cells 36 that are activated at the specified working point (step S20).

The control unit 20 may carry out the processing of steps S10 and S12 simultaneously with the processing of steps S14 through S20, or may alternatively start the other series of the processing after completion of one series of the processing.

The control unit 20 subsequently subtracts the output electric power of the fuel cells 36 estimated at step S20 from the required output of the inverter 44 calculated at step S12 to determine a difference (step S22). When the difference is not less than zero, the program proceeds to the processing at steps S24–S30. When the difference is less than zero, on the other hand, the program proceeds to the processing at steps S32–S46. In the state that the difference is not less than zero, the required output of the inverter 44 is not supplied sufficiently by the output electric power of the fuel cells 36. In the state that the difference is less than zero, the output electric power of the fuel cells 36 is in excess after the supply to the inverter 44.

In the case that the difference is not less than zero, the control unit 20 first inputs the state of charge (SOC) of the battery 40 measured by the SOC sensor 42 (step S24).

As described previously, the data representing the output electric current-output voltage characteristics at the respective SOCs as the parameter in the battery 40 are stored in the ROM 20b included in the control unit 20.

Figure 4:
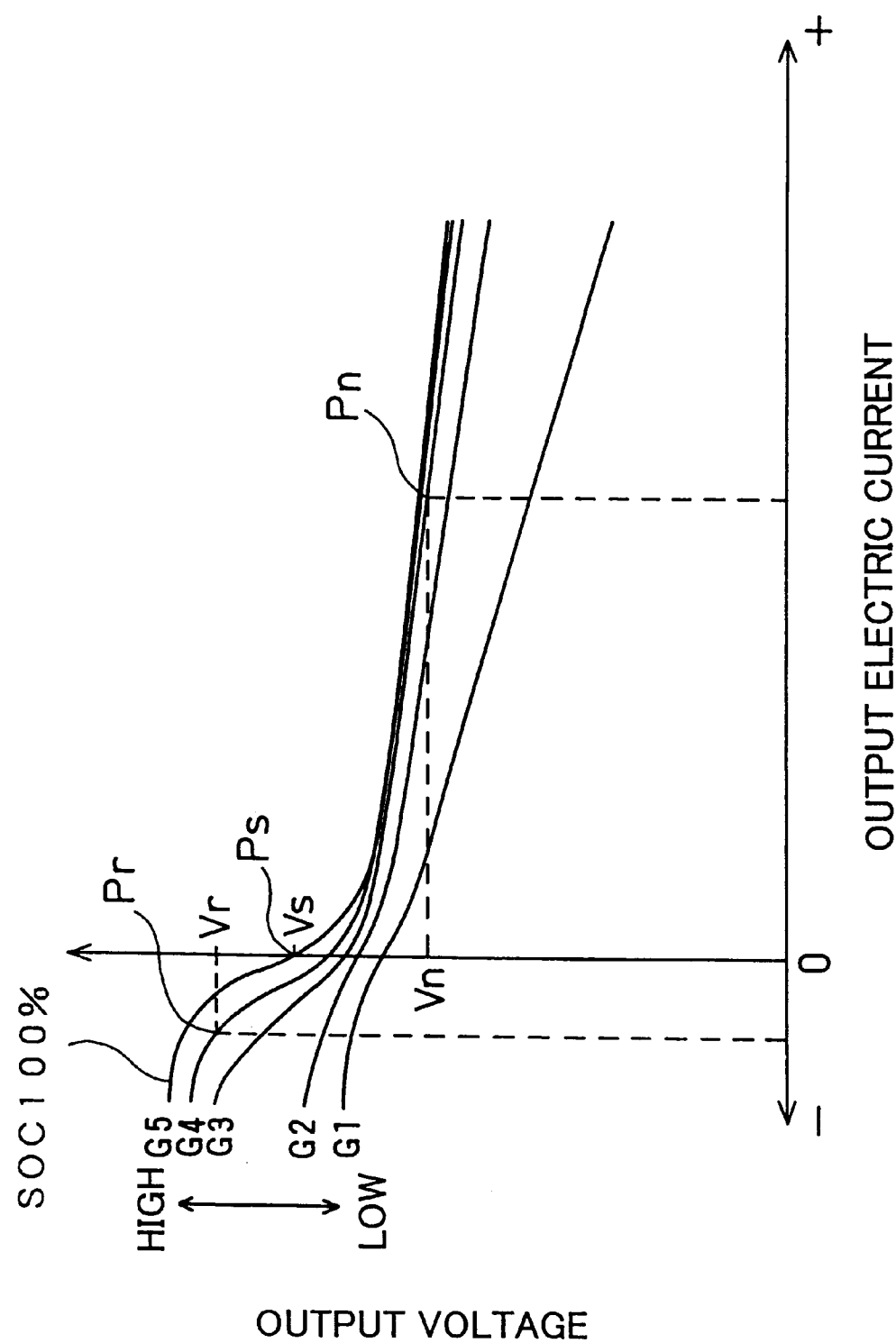
FIG. 4 is a characteristic chart showing variations in output electric current-output voltage characteristic with a variation in SOC as a parameter in the battery 40 shown in FIG. 1.
Figure 5:
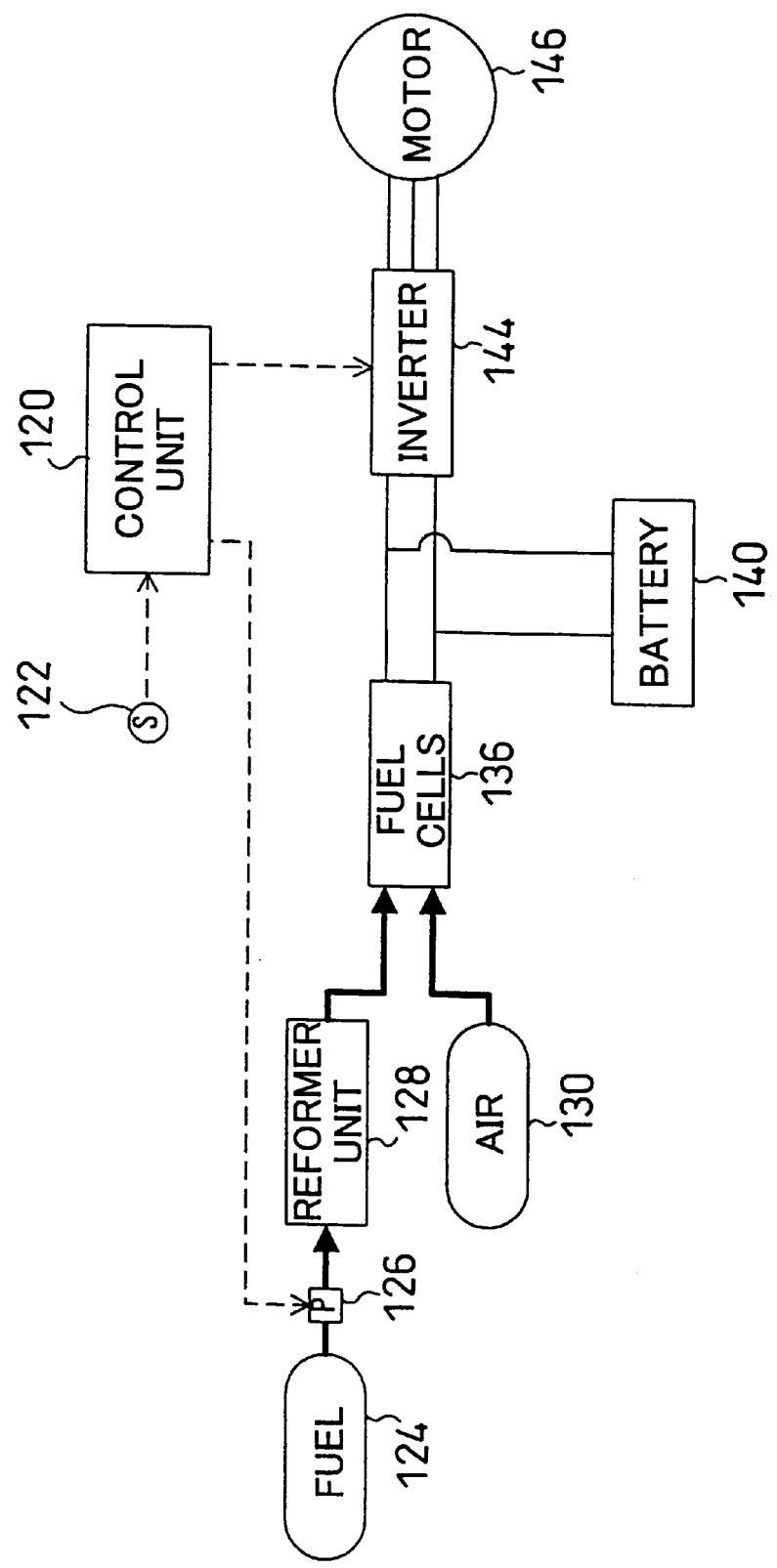
FIG. 5 illustrates the structure of a background art fuel cells system.
Figure 6:
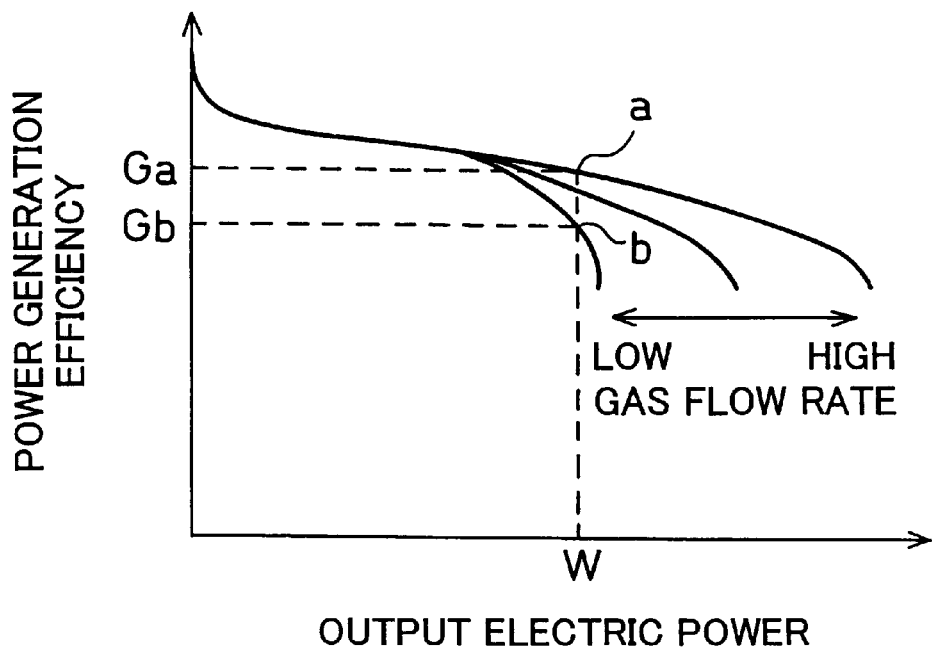
FIG. 6 is a characteristic chart showing variations in power generation efficiency against the output electric power in general fuel cells with a variation in quantity of the gaseous fuel (the gas flow rate) supplied to the fuel cells as a parameter.
Figure 7:
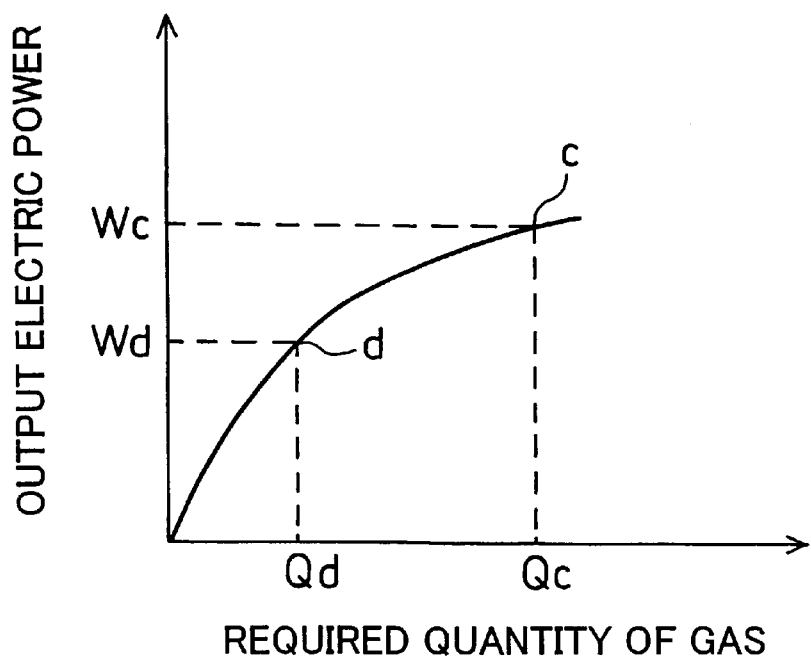
FIG. 7 is a characteristic chart showing a variation in output electric power against the required quantity of the gaseous fuel in general fuel cells.

FIG. 4 is a characteristic chart showing variations in output electric current-output voltage characteristic with a variation in SOC as the parameter in the battery 40 shown in FIG. 1. In the graph of FIG. 4, the output voltage of the fuel cells 36 is plotted as the ordinate and the output electric current is plotted as the abscissa.

As shown in FIG. 4, the output electric current-output voltage characteristic of the fuel cells 36 is varied with a variation in SOC in the battery 40. The process of specifying the SOC unequivocally determines the output electric current-output voltage characteristic corresponding to the specified SOC. In the graph of FIG. 4, the characteristic curve changes as G1, G2, . . . to G5 in a sequence of the SOC. The output electric current-output voltage characteristics at the respective SOCs are stored in the ROM 20b.

The control unit 20 reads the output electric current-output voltage characteristic corresponding to the input SOC from the ROM 20b in the control unit 20. The control unit 20 subsequently determines the output voltage required for the battery 40 from the difference between the required output of the inverter 44 and the output electric power of the fuel cells 36 obtained at step S22, based on the read-out output electric current-output voltage characteristic (step S26).

As a concrete example, when the characteristic curve G3 shown in FIG. 4 is read as the output electric current-output voltage characteristic corresponding to the observed SOC, the control unit 20 computes a point at which the product of the output voltage and the output electric current (that is, the output electric power of the battery 40) is substantially equal to the difference between the required output of the inverter 44 and the output electric power of the fuel cells 36 on the read-out output electric current-output voltage characteristic curve G3. It is here assumed that the computed point is Pn shown in FIG. 4. An output voltage Vn of the battery 40 at the computed point Pn is then determined as the output voltage required for the battery 40.

The control unit 20 then controls the DC—DC converter 38 and thereby regulates the output voltage of the DC—DC converter 38 to the output voltage determined at step S26 (step S28). The output voltage of the DC—DC converter 38 is applied respectively to the battery 40 and the inverter 44. Regulating the output voltage of the DC—DC converter 38 in this manner causes the output voltage of the battery 40 to be equal to the output voltage determined at step S26. The regulation causes the electric power corresponding to the difference between the required output of the inverter 44 and the output electric power of the fuel cells 36 obtained at step S22 to be output from the battery 40 as the output electric power.

The control unit 20 subsequently controls the inverter 44, so as to cause the motor 46 to consume via the inverter 44 the electric power corresponding to the required output of the inverter 44 calculated at step S12. The electric power output from the battery 40 is accordingly supplied to the inverter 44, and the insufficiency of the electric power (that is, the difference between the required output of the inverter 44 and the output electric power of the battery 40) is taken out of the fuel cells 36 and supplied to the inverter 44 (step S30).

The control unit 20 controls the DC—DC converter 38 and the inverter 44 in the above manner, so as to enable the output electric power estimated at step S20 to be taken out of the fuel cells 36, which is activated at the working point of the highest energy conversion efficiency.

In the case in which the difference between the required output of the inverter 44 and the output electric power of the fuel cells 36 obtained at step S22 is less than zero, on the other hand, the control unit 20 inputs the SOC of the battery 40 measured by the SOC sensor 42 (step S32) in the same manner as the processing of step S24, and determines whether or not the input SOC is less than 100% (step S34). When the input SOC is less than 100%, the program determines that the battery 40 still has a margin of accumulating further electric power and proceeds to the processing at steps S36–S40. When the input SOC is equal to 100%, on the other hand, the program determines that the battery 40 does not have any margin of accumulating further electric power and proceeds to the processing at steps S42–S46.

In the case in which the input SOC is less than 100%, in the same manner as in the processing of step S26, the control unit 20 reads the output electric current-output voltage characteristic corresponding to the input SOC, and determines the output voltage required for the battery 40 from the difference between the required output of the inverter 44 and the output electric power of the fuel cells 36 obtained at step S22, based on the read-out output electric current-output voltage characteristic (step S36).

As a concrete example, as described above, when the characteristic curve G3 is read as the output electric current-output voltage characteristic corresponding to the input SOC, the control unit 20 computes a point at which the product of the output voltage and the output electric current is substantially equal to the difference between the required output of the inverter 44 and the output electric power of the fuel cells 36 on the read-out output electric current-output voltage characteristic curve G3. Unlike the processing of step S26, however, since the difference between the required output of the inverter 44 and the output electric power of the fuel cells 36 is less than zero (that is, negative), the processing of step S36 computes the point at which the product of the output voltage and the output electric current (that is, the output electric power of the battery 40) is negative. The expression that the electric power output from the battery 40 is negative means that electric power is accumulated into the battery 40. As shown in FIG. 4, the output voltage of the battery 40 does not take any negative values, so that the processing computes the point of the negative output electric current.

It is here assumed that the computed point is Pr shown in FIG. 4. An output voltage Vr of the battery 40 at the computed point Pr is then determined as the output voltage required for the battery 40.

The control unit 20 subsequently controls the DC—DC converter 38 and thereby regulates the output voltage of the DC—DC converter 38 to the output voltage determined at step S36 (step S38). Such regulation causes the output voltage of the battery 40 to be equal to the output voltage determined at step S26, and the electric power is accumulated in the battery 40. That is, this control process causes the electric power to be taken out of the fuel cells 36 and enables the electric power corresponding to the absolute value of the difference between the required output of the inverter 44 and the output electric power of the fuel cells 36 obtained at step S22, out of the total output electric power, to be accumulated in the battery 40.

The control unit 20 then controls the inverter 44, so as to cause the motor 46 to consume via the inverter 44 the electric power corresponding to the required output of the inverter 44 calculated at step S12. The electric power corresponding to the calculated required output of the inverter 44 (that is, the residual electric power that has not been accumulated in the battery 40) out of the total electric power taken out of the fuel cells 36 is accordingly supplied to the inverter 44 and consumed by the motor 46 (step S40).

The control unit 20 controls the DC—DC converter 38 and the inverter 44 in the above manner, so as to enable the output electric power estimated at step S20 to be taken out of the fuel cells 36, which is activated at the working point of the highest energy conversion efficiency.

In the case in which the input SOC is equal to 100%, on the other hand, the control unit 20 reads the output electric current-output voltage characteristic corresponding to the SOC=100%, and determines the output voltage required for the battery 40 in the case in which the output electric power of the battery 40 is equal to zero, based on the read-out output electric current-output voltage characteristic (step S42).

In the example of FIG. 4, the characteristic curve G5 represents the output electric current-output voltage characteristic corresponding to the SOC=100%, and is read out here. The control unit 20 accordingly computes a point at which the output electric power of the battery 40 (that is, the product of the output voltage and the output electric current) is equal to zero on the read-out output electric current-output voltage characteristic curve G5. Since the output voltage of the battery 40 does not take any negative values as shown in FIG. 4, the control unit 20 computes the point at which the output electric current is equal to zero.

In the example of FIG. 4, at a point Ps, the output electric power of the battery 40 is equal to zero. An output voltage Vs of the battery 40 at the point Ps is accordingly determined as the output voltage required for the battery 40.

The control unit 20 subsequently controls the DC—DC converter 38 and thereby regulates the output voltage of the DC—DC converter 38 to the output voltage determined at step S42 (step S44). Such regulation causes the output voltage of the battery 40 to be equal to the output voltage determined at step S42. The output electric power of the battery 40 is accordingly equal to zero. The electric power is neither output from the battery 40 nor accumulated in the battery 40.

The control unit 20 then controls the inverter 44, so as to cause the motor 46 to consume via the inverter 44 the electric power corresponding to the required output of the inverter 44 calculated at step S12. The electric power corresponding to the required output of the inverter 44 is accordingly taken out of the fuel cells 36 and is supplied to the inverter 44 to be consumed by the motor 46 without being accumulated in the battery 40 (step S46).

In this case, the electric power taken out of the fuel cells 36 corresponds to the required output of the inverter 44, and may not be coincident with the output electric power estimated at step S20. There is accordingly a fair possibility that the fuel cells 36 are activated at a working point other than the working point specified at step S18.

The above description does not specifically refer to the control procedure executed by the control unit 20 to control the pump 26. The control unit 20 controls the pump 26 according to any of the following procedures to adjust the quantities of the fuel supplied to the reformer unit 28. For example, the control unit 20 regulates the quantities of the fuel supplied to the reformer unit 28 according to the mean value of the actual output electric power from the inverter 44 to the motor 46 in the past several seconds. In other examples, the quantities of the fuel are regulated according to the accelerator travel (that is, the required output of the inverter 44) or according to the SOC of the battery 40. The quantities of the fuel may be regulated by a combination thereof. Another procedure controls the pump 26 to simply supply fixed quantities of the fuel to the reformer unit 28.

As described above, the operation of the embodiment enables the fuel cells 36 to be activated at the working point of the highest energy conversion efficiency in the case other than the operation of step S46. This arrangement preferably raises the energy conversion efficiency of the fuel cells 36 and thus enhances both the power generation efficiency and the gas utilization factor of the fuel cells as much as possible.

The present invention is not restricted to the above embodiment or its modifications, but there may be many other modifications, changes, and alterations without departing from the scope or spirit of the main characteristics of the present invention.

In the arrangement of the embodiment described above, the data representing the output electric current-output voltage characteristics at the respective gas flow rates as the parameter in the fuel cells 36 are stored in advance in the ROM 20b included in the control unit 20. The control unit 20 reads the output electric current-output voltage characteristic corresponding to the input gas flow rate, and computes the specific point of the highest energy conversion efficiency of the fuel cells 36 on the read-out output electric current-output voltage characteristic. The control unit 20 then specifies the computed specific point as the working point of the fuel cells 36 and estimates the output electric power of the fuel cells 36, which are activated at the specified working point. The operation of the present invention is, however, not restricted to this arrangement. In accordance with one modified arrangement, data representing the points of the highest energy conversion efficiency on the output electric current-output voltage characteristics corresponding to the respective gas flow rates are stored in advance in the ROM 20b included in the control unit 20. In this case, the control unit 20 reads the point of the highest energy conversion efficiency corresponding to the input gas flow rate from the ROM 20b in the control unit 20. In accordance with another modified arrangement, data representing the output electric powers of the fuel cells 36 that are activated at the working points of the highest energy conversion efficiency corresponding to the respective gas flow rates are stored in advance in the ROM 20b included in the control unit 20. In this case, the control unit 20 reads the output electric power of the fuel cells 36 corresponding to the input gas flow rate from the ROM 20b in the control unit 20.

As described above, the data representing the point of the highest energy conversion efficiency and the data representing the output electric power of the fuel cells that are activated at the working point of the highest energy conversion efficiency are stored in the ROM 20b included in the control unit 20. This arrangement desirably relieves the load of the processing executed by the control unit 20.

In the embodiment discussed above, the supplies of methanol and water are fed as the fuel 24 to the reformer unit 28. The operation of the present invention is, however, not restricted to this fuel, but methane, ethanol, natural gas, gasoline, light oil, etc., may replace methanol.

The present invention is not restricted to electric vehicles with the fuel cells system mounted thereon, but is industrially applicable for any other transportation with a fuel cells system mounted thereon, for example, vehicles, ships, aircraft, etc. and any commercial and domestic electrical equipment to which a fuel cells system is applied.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A fuel cell system having fuel cells, which receive a supply of a gas and generate electric power, and supply the generated electric power to a load, said fuel cell system comprising:

a gas flow rate-relating quantity measurement unit that measures a gas flow rate-relating quantity, which relates to a flow rate of the gas supplied to said fuel cells; and a control unit configured to specify a point of highest energy conversion efficiency on an output electric current-output voltage characteristic of said fuel cells corresponding to the measured gas flow rate-relating quantity as a working point, and to regulate electric power to be taken out of said fuel cells, so as to cause said fuel cells to be activated at the specified working point.

2. A fuel cell system having fuel cells, which receive a supply of a gas and generate electric power, and supply the generated electric power to a load, said fuel cell system comprising:

means for measuring a gas flow rate-relating quantity which relates to a flow rate of the gas supplied to said fuel cells; and means for specifying a point of highest energy conversion efficiency on an output electric current-output voltage characteristic of said fuel cells corresponding to the measured gas flow rate-relating quantity as a working point, and for regulating electric power to be taken out of said fuel cells for causing said fuel cells to be activated at the specified working point.

* * * * *